Aug. 29, 1950  R. F. DEHN  2,520,495
SHEAR PRESS BACK GAUGE
Filed Feb. 14, 1947  11 Sheets-Sheet 2

INVENTOR.
ROY F. DEHN
BY
Kwis, Hudson, Boughton & Williams
ATTORNEYS

Aug. 29, 1950  R. F. DEHN  2,520,495
SHEAR PRESS BACK GAUGE
Filed Feb. 14, 1947  11 Sheets-Sheet 9

INVENTOR.
ROY F. DEHN
BY
Kwis, Hudson, Boughton & Williams
ATTORNEYS

Aug. 29, 1950 — R. F. DEHN — 2,520,495
SHEAR PRESS BACK GAUGE
Filed Feb. 14, 1947 — 11 Sheets-Sheet 10

INVENTOR.
ROY F. DEHN
BY
Kwis, Hudson, Boughton & Williams
ATTORNEYS

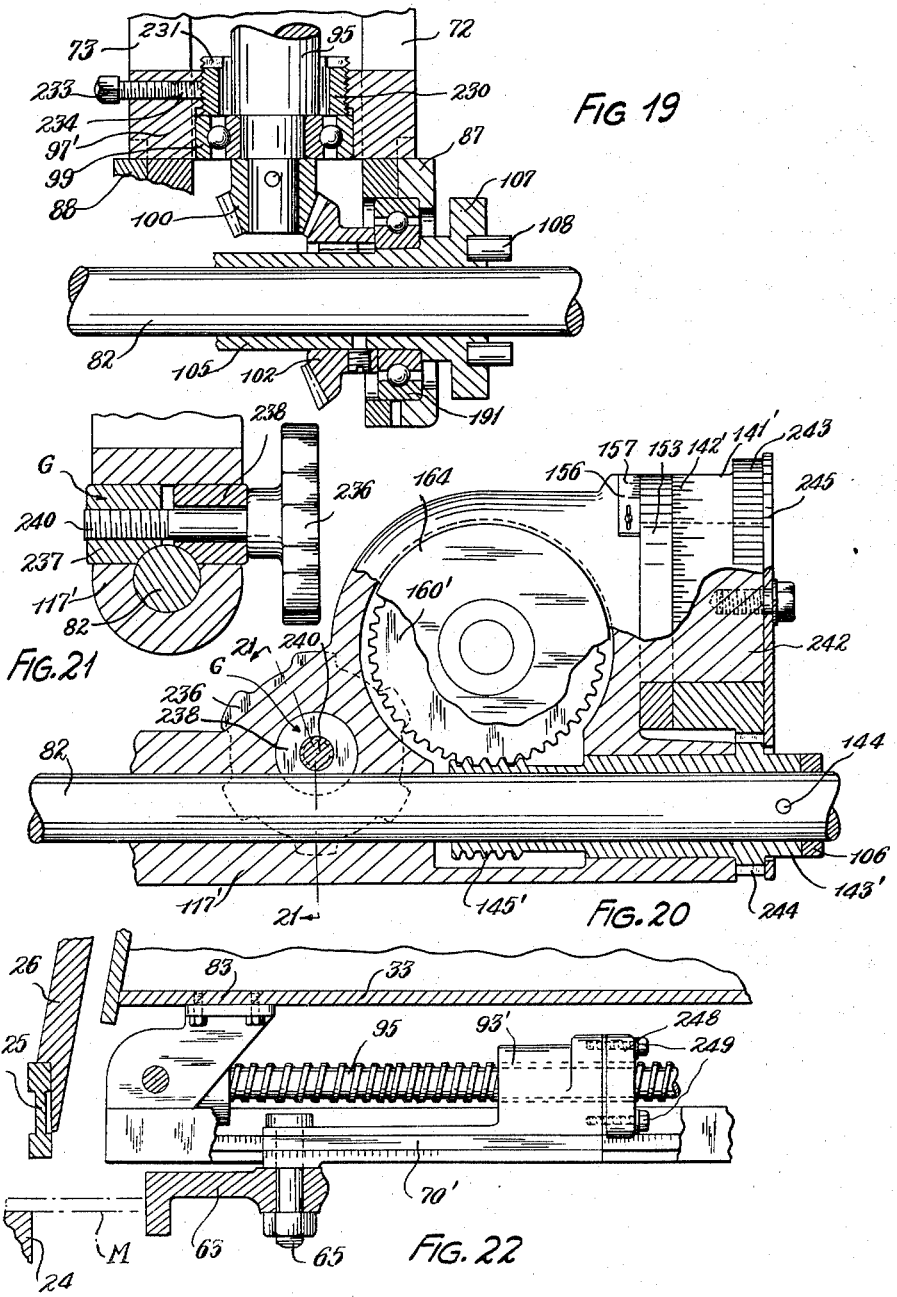

Patented Aug. 29, 1950

2,520,495

UNITED STATES PATENT OFFICE 2,520,495

SHEAR PRESS BACK GAUGE

Roy F. Dehn, Cleveland, Ohio, assignor to The Cleveland Crane & Engineering Company, Wickliffe, Ohio, a corporation of Ohio Application February 14, 1947, Serial No. 728,425

28 Claims. (Cl. 164—59)

The present invention relates to shears and, more particularly, to power-operated shears provided with back gauge mechanism.

The present application is a continuation-in-part of my copending application for patent, Serial No. 641,325, filed January 15, 1946, and now abandoned.

One of the principal objects of the invention is the provision of novel and improved back gauge mechanism for power-operated shears, which mechanism is simple in construction, inexpensive to manufacture, reliable and accurate in operation, and readily set in the desired position.

Another object of the invention is the provision of a novel and improved back gauge mechanism adjusted to any desired angle with respect to the knives of the shears, and/or can be readily moved into or out of operative position.

Another object of the invention is the provision of a novel and improved adjustable back gauge for a heavy duty shear press, which back gauge includes remote means for indicating the relative position of the back gauge interconnected therewith through suitable gear trains provided with adjustable means for controlling and eliminating gear backlash whereby the accuracy of the indicating means is substantially increased.

Another object of the invention is the provision of a novel and improved adjustable back gauge for a heavy duty shear press of the type referred to having two indicating dials, one reading in fractions of the graduations of the other and both geared to the adjusting mechanism for facilitating and increasing the accuracy of the adjustments of the mechanism.

Still another object of the invention is the provision of a novel and improved adjustable back gauge of the character referred to having an easily accessible locking means for locking the mechanism in an infinite number of adjusted positions.

A further object of the invention is the provision of a novel and improved power shears of the general type employed in shops engaged in the fabrication of metal plates and the like, and having an oscillatable upper leaf including back gauge mechanism.

A still further object of the invention is the provision of a novel and improved power shears of the type referred to, having a movable cutting blade and back gauge for positioning material to be sheared relative thereto, the back gauge being adjusted by an independently mounted electric motor and movable relative to the blade and motor into and out of operative position.

The invention resides in certain constructions and combinations and arrangements of parts, and further objects and advantages will be apparent to those skilled in the art to which it relates from the following description of the preferred embodiment described with reference to the accompanying drawings forming a part of this specification in which similar reference characters designate corresponding parts throughout the several views, and in which:

Fig. 19 is a fragmentary sectional view on the line 5—5 of Fig. 4 showing provision for eliminating gear backlash;

Fig. 20 is a view partially broken away of a modified construction of a dial indicating and locking mechanism;

Fig. 21 is a sectional view on the line 21—21 of Fig. 20; and,

Fig. 22 is a view similar to Fig. 16 showing a modified form of slide member, parts of the guide therefor being broken away for clarity.

Figure 1:
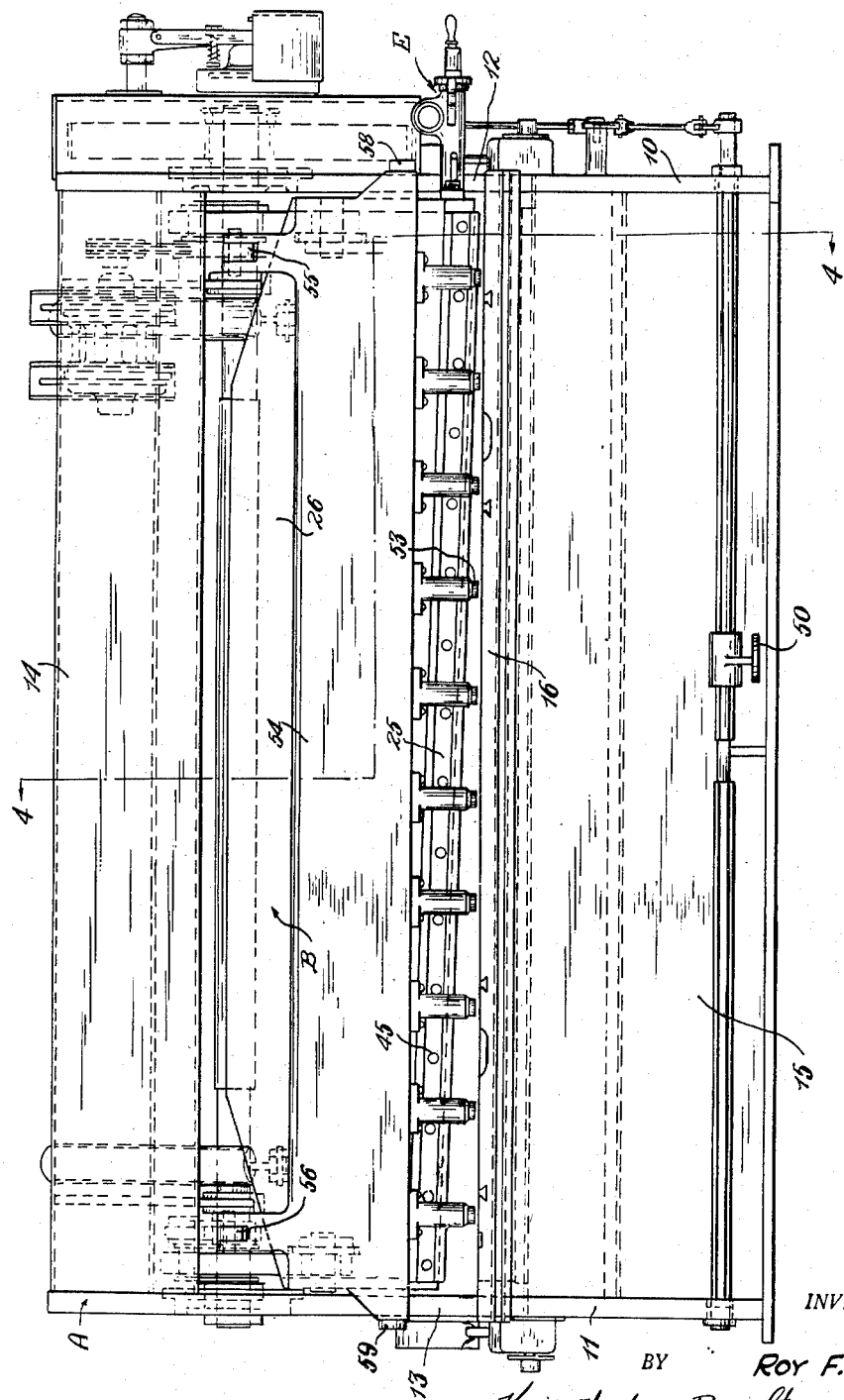
Fig. 1 is a front elevational view of a power-operated, heavy duty shears embodying the present invention.
Figure 2:
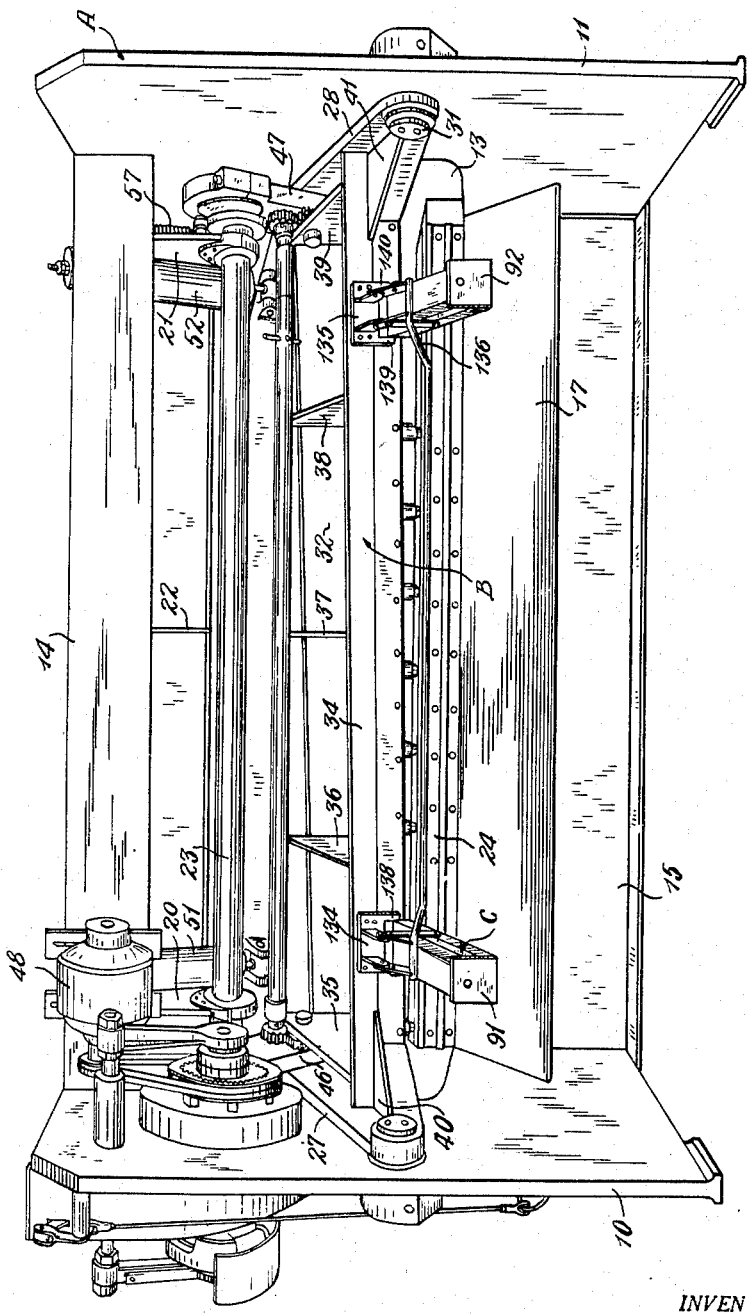
Fig. 2 is a rear view of the shears.

To a large extent, the shears shown herein is similar to the shears shown and described in United States patent to William G. Wehr, No. 2,397,896, and only those parts of the shears which are necessary to a complete understanding of the present invention are herein shown and described in detail. Reference to the aforesaid patent is made for a complete showing and description of those parts of the shears not fully shown and described herein.

Referring to the drawings, the reference character A designates a frame comprising stress-resisting, plate-like end members or side housings 10, 11 having aligned openings 12, 13, respectively, in their front edges; a crown 14; and a bed comprising plate-like members 15, 16, 17, the latter of which forms a scrap chute. The vertical plate-like member 15 is located immediately to the rear of and welded to the horizontal plate-like member 16, which member in addition to reinforcing the upper edge of the member 15, forms a support or work table for the work. The upper member or crown 14 is generally box-shaped in cross-section and has its opposite ends welded to the side housings 10, 11 adjacent to their front upper edges. Web members 20, 21, 22 welded to the interior of the member 14 reinforce the same and the lower ends of the members 20, 21 which extend below the rear side of the member 14 form supports for suitable bearings within which a crankshaft 23 is rotatably supported.

The shearing operation is performed by a stationary shearing knife 24 located in a cut-out portion at the upper rear corner of the bed and a movable shearing knife 25 connected to the lower front edge of a movable ram or blade, designated generally by the reference character B. The movable ram or upper blade B which extends substantially from one side of the housing to the other is of built-up construction and comprises a longitudinally extending front plate 26 welded to the front ends of rearwardly extending end members 27, 28, the rear ends of which are rotatably connected to short, shaft-like members 30, 31 rotatably supported in suitable apertures in the side housings 10, 11, respectively, for rotation about an axis eccentric to the axis about which the end members 27, 28 are rotatable. The axis about which the ram or blade B is pivoted is preferably slightly above the plane of the work supporting surface of the bed.

In addition to the front plate 26 and the end members or plates 27, 28, the upper blade or ram B comprises a plate 32 extending between and welded to the end members 27, 28 and a bottom plate 33 having an upwardly extending rear flange 34. The front edge of the bottom plate 33 abuts against and is welded to the rear side of the plate 32 adjacent to the lower edge thereof, and the ends of the bottom plate are welded to the end members 27, 28. The blade assembly is reinforced by web members 35, 36, 37, 38, 39 welded to the front plates 26 and 32 and to the bottom plate 33 and by triangular plates 40, 41 welded to the rear side of the bottom plate 33 and the end members 27, 28.

Figure 3:
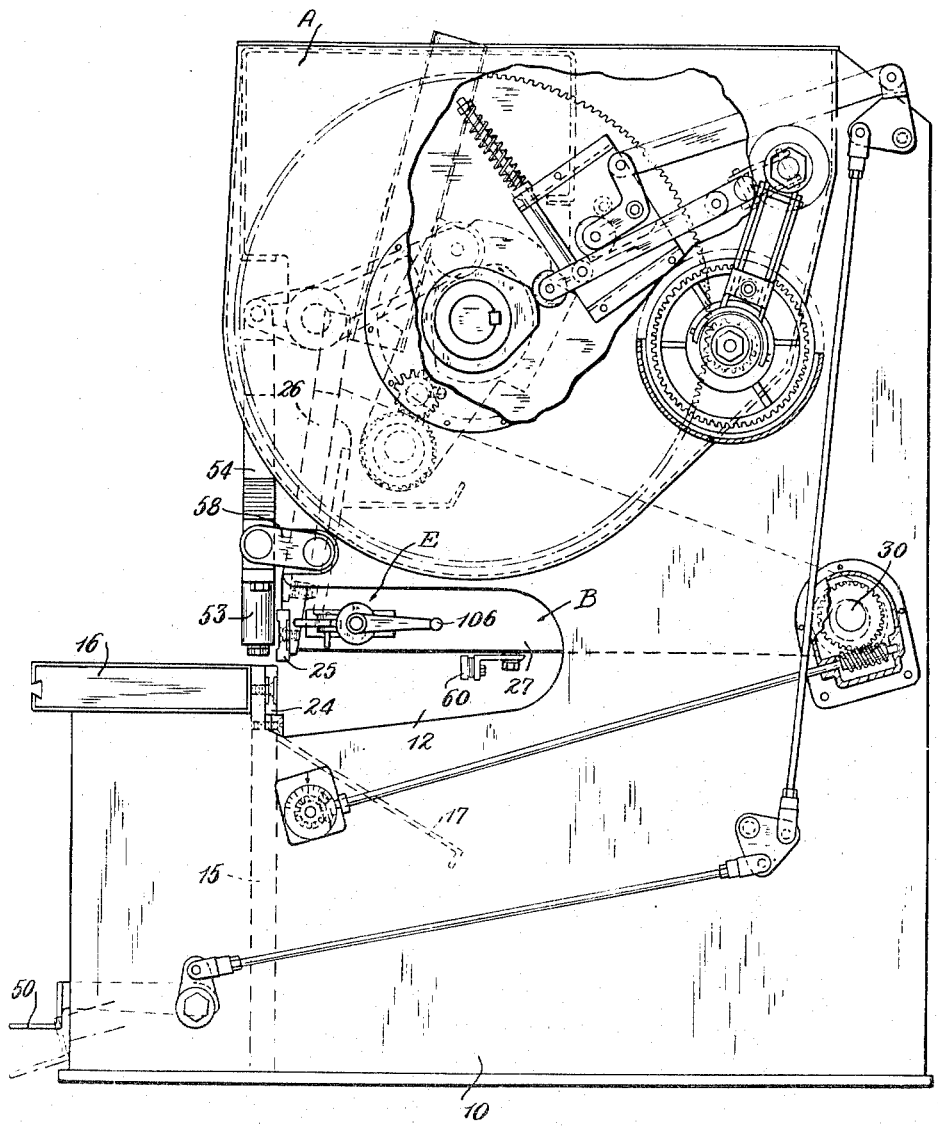
Fig. 3 is an end view of the shears, looking from the right of Fig. 1.
Figure 4:
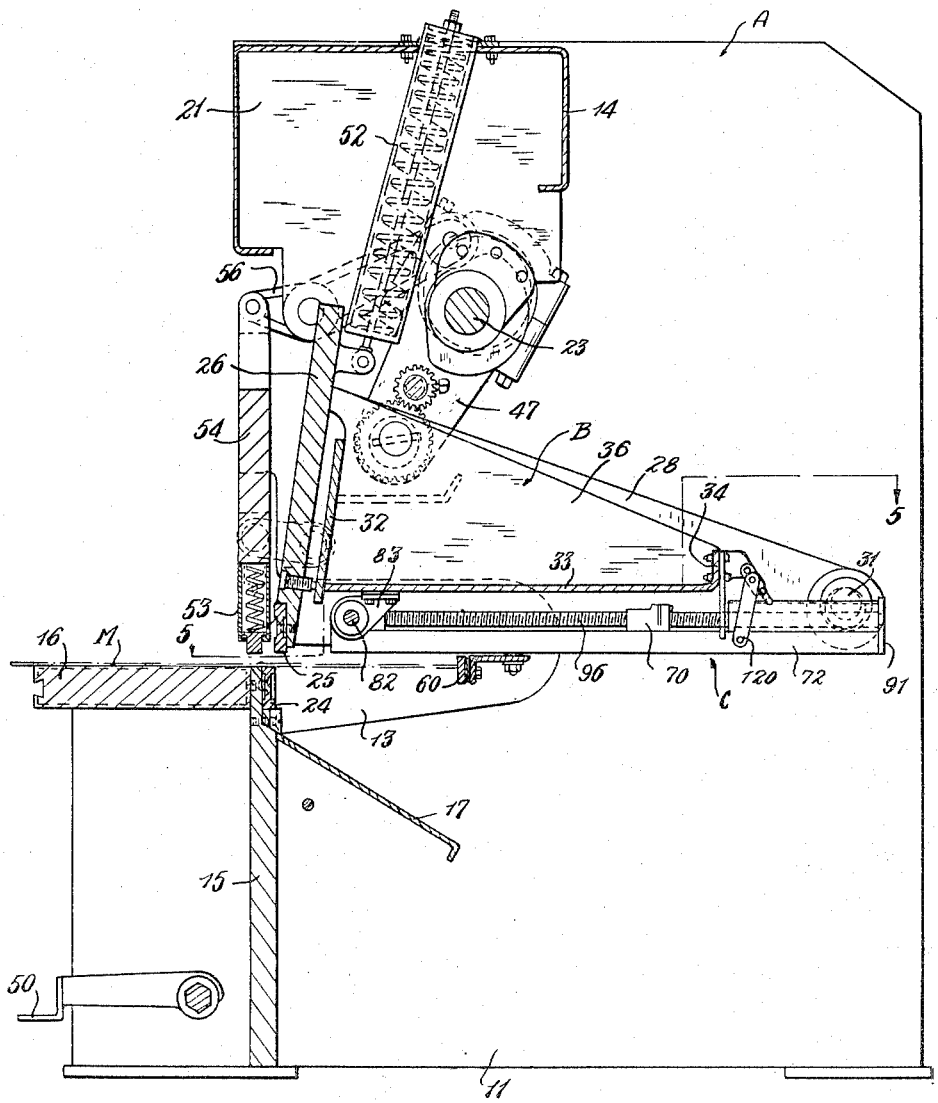
Fig. 4 is a sectional view approximately on the line 4—4 of Fig. 1.

The front plate 26 of the blade B is inclined at a slight angle to the vertical, as clearly shown in Figs. 3 and 4, to provide clearance between the ram or blade B and the stationary knife when the blade is oscillated. The lower front edge of the plate 26 is cut out so as to receive the upper shearing knife 25, which knife is held in position therein by a plurality of screws 45 projecting therethrough and threaded into suitably tapped apertures adjacent to the lower edge of the plate 26. The heads of the screws 45 are located in a groove in the front face of the shearing knife and are countersunk so as not to interfere with the oscillation of the movable blade B. The lower edge of the plate 26 is inclined lengthwise so that the knives will effect a true shearing action.

The front end of the ram or movable blade B is supported and the entire blade assembly is adapted to be oscillated about the shafts 30, 31 by pitmans 46, 47, the upper ends of which are operatively connected to eccentrics on the crankshaft 23. The lower ends of the pitmans are connected to short shafts fixed in opposite ends of the blade B. The crankshaft 23 is rotated to reciprocate the movable ram or blade B by an electric motor 48 adjustably secured to the back of the crown 14 and operatively connected to the crankshaft by means including a friction clutch and brake operated in such a manner that when the treadle 50 is depressed and immediately released, the crankshaft makes one complete revolution but will continue to rotate as long as the foot pedal is depressed. As shown, the weight of the movable blade B is counterbalanced by adjustable compression springs, one at either end of the ram, located within tubular housings 51, 52 fixed to the crown member 14.

The shears shown also include a plurality of spring-loaded, hold-down devices 53 detachably bolted to the lower edge of a hold-down plate 54 suspended from the forward arms of bell crank levers 55, 56 pivotally connected to the plates 20, 21, the rear arms of which levers are provided with rollers adapted to engage cams on the crankshaft 23. The levers 55, 56 are continuously urged in a clockwise direction, as viewed in Fig. 3, to engage the rollers thereon with the cams on the crankshaft by suitable compression springs 57 interposed therebetween and the top of the crown member 14. The lower part of the hold-down plate 54 is connected to the side housings 10, 11 by links 58, 59, one at either side of the hold-down plate, pivotally connected to the hold-down plate and to the side housings 10, 11.

Figures 5, 6, 7:
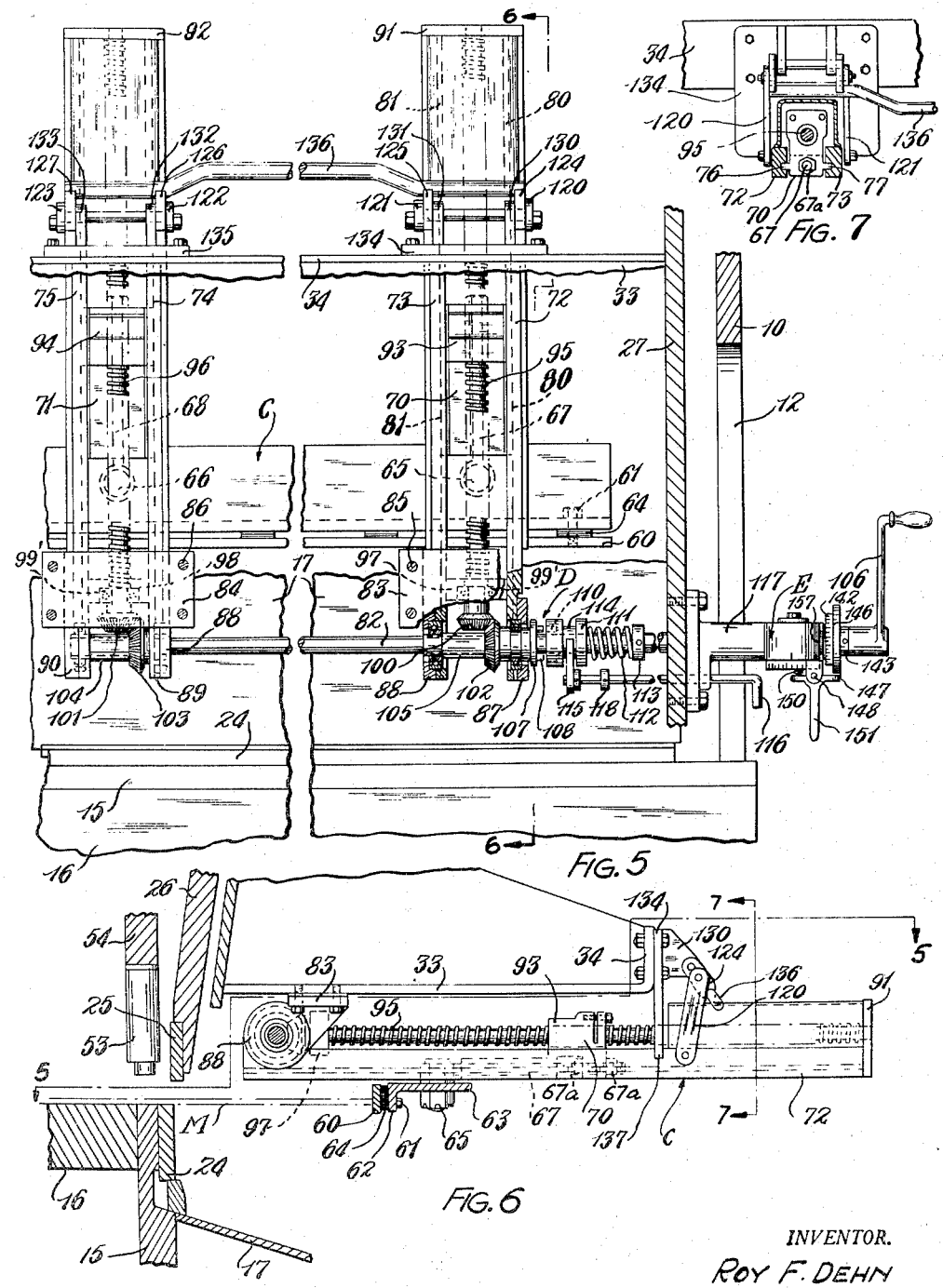
Fig. 5 is a fragmentary sectional view approximately on the line 5—5 of Fig. 4.
Fig. 6 is an enlarged view of a portion of Fig. 4.
Fig. 7 is a fragmentary sectional view on the line 7—7 of Fig. 6.
Figure 8:
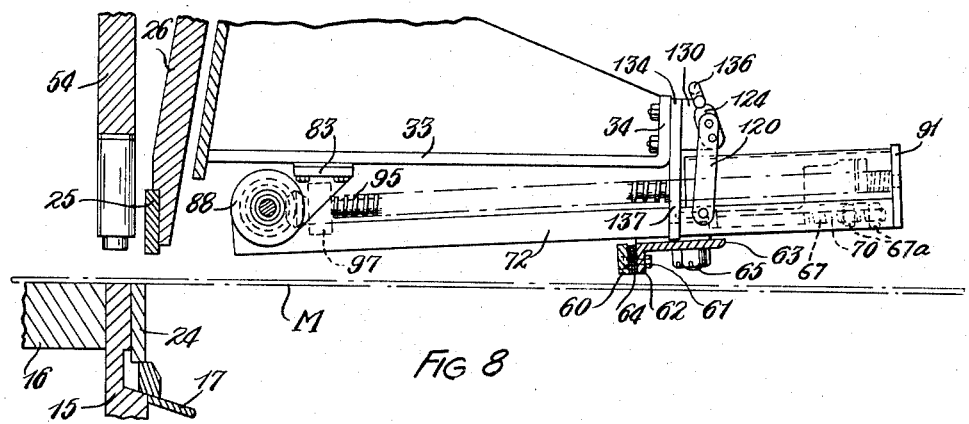
Fig. 8 is a view similar to Fig. 6, but showing the back gauge raised to inoperative position.

In order to facilitate the locating of material to be cut, the shears shown comprise back gauge mechanism carried by the movable ram or blade B and designated generally by the reference character C. The back gauge mechanism includes a stop proper in the form of a transversely extending bar 60 against which the material to be cut is adapted to abut so as to locate it in a desired position with respect to the shearing knives. The bar 60 is detachably connected, as by bolts 61, to a downwardly projecting flange 62 of a transversely extending angle iron 63. Shims 64 surrounding the bolts 61 and interposed between the bar 60 and the flange 62 provide means for adjusting the bar relative to the angle iron 63. This construction makes it possible to maintain a true or straight surface for the work to abut against. Opposite ends of the angle iron 63 are pivotally connected by a pair of bolts 65, 66 to I-bolt-shaped members 67, 68, the heads of which are located adjacent to the forward ends of slides 70, 71 movably supported by pairs of guides 72, 73 and 74, 75 located underneath the ram or blade proper and extending from adjacent to the front end of the blade to approximately the pivots 30, 31. The members 67, 68 include rearwardly extending, cylindrical shank portions which project through suitable apertures in the slides 70, 71. Jam nuts, such as 67a, on the rear threaded ends of the shank portions of the members 67, 68 and which engage opposite sides of downwardly extending flanges or projections on the slides 70, 71, see Figs. 6, 7 and 8 provide means for adjusting the members 67, 68, and hence the stop 60, relative to the slides 70, 71, respectively, thereby facilitating the location of the stop 60 with respect to the shear knives for a given position of the slides.

If the adjustment effected by the jam nuts is considered unnecessary, the angle iron 63 may be directly bolted to an integral extension on the slides as clearly shown in Fig. 22, reference to which in greater detail will hereinafter be made.

The guides 72, 73 are spaced with respect to each other and the slide 70 is positioned therebetween with suitable projections 76, 77 on opposite sides thereof engaging within suitable grooves 80, 81 in the adjacent faces of the members 72, 73, respectively. The slide 71 is supported in the guides 74, 75 in a similar manner. The forward ends of the guide members 72, 73 and 74, 75 are pivotally connected to a longitudinally extending shaft 82 rotatably supported by brackets 83, 84 connected by bolts 85, 86, respectively, to the underside of the plate 33. The brackets 83, 84 have forwardly extending bosses 87, 88, 89, 90, respectively, within which the shaft 82 is rotatably supported by antifriction bearings and the forward ends of the guides are pivotally supported on the outer races of the same bearings. The rear ends of the guides 72, 73 and 74, 75 are connected together and held in predetermined spaced relation by members 91, 92, respectively, welded thereto.

The slides 70, 71 have upwardly extending portions 93, 94, respectively, provided with threaded apertures through which lead screws 95, 96, respectively, project and through the medium of which the slides are adapted to be moved. The rear parts of the projections 93, 94 are spaced from the main portions thereof by grooves and are adapted to be moved relative to the projections proper by suitable screws. The construction is such that backlash or lost motion between the lead screws and the slides can be eliminated. The rear ends of the lead screws 95, 96 are rotatably supported in the members 91, 92 and their forward ends which are rotatably supported by antifriction bearings 99, 99' in members 97, 98 welded to the forward ends of the guide members 72, 73 and 74, 75, respectively, are provided with beveled gears 100, 101, in mesh with beveled gears 102, 103. The antifriction bearings 99, 99' take the axial thrust of the beveled gears 100, 101, respectively, and if desired provision can be made for axially adjusting the bearings 99, 99' in their supporting members 97, 98 for controlling clearance between the gear teeth and eliminating any backlash or other free play therebetween. An embodiment of the invention incorporating such a provision is shown in Fig. 19, reference to which will hereinafter be made. The gear 103 is keyed to a short sleeve 104 fixed to the left-hand end of the shaft 82, as viewed in Fig. 5, and the gear 102 is keyed to a short sleeve 105 surrounding the shaft 82 and rotatable thereon. The shaft 82 projects to the right, as viewed in Fig. 5, beyond the end member 27 of the ram and through the cut-out portion 12 of the side housing. The projecting end of the shaft is provided with a hand crank 106 for manually rotating the same. Alternatively, the shaft 82 may be motor driven, if desired, as will be hereinafter more fully described.

The sleeve 105 to which the gear 102 is fixed is adapted to be selectively connected to the shaft 82 so that the lead screws 95, 96 may be simultaneously rotated or the lead screw 96 rotated alone, by a suitable clutch designated generally by the reference character D. In the embodiment shown, the driven element of the clutch D comprises a flange 107 formed integral with the right-hand end of the hub of the gear 102 and provided with a plurality of axially projecting pins 108 adapted to engage within suitable apertures 110 in the driving element 111 which in turn is splined to the shaft 82 to the right of the gear 102. The driving element 111 of the clutch D is continuously urged toward the left, as viewed in Fig. 5, to engage the pins 108 in the apertures 110 by a compression spring 112 surrounding the shaft 82 and interposed between the right-hand end of the driving element 111 and a collar 113 adjustably connected to the shaft 82 by a setscrew. The driving element 111 has an external groove 114 within which a yoke member 115 engages, and through the medium of which the driving element can be moved toward the right to disconnect the same from the driven element of the clutch. The member 115 is connected to a rod 116 projecting through the aperture 12 in the side housing 10. The rod 116 is slidably supported in a housing 117 bolted to the outside of the end plate 27, which housing also supports the right-hand end of the shaft 82, and a member 118 welded or otherwise secured to the underside of the plate 33. The end of the rod 116 which projects beyond the side housing 10 is provided with a hand grasp for facilitating manual manipulation of the rod.

The front ends of the guide assemblies, including the guide members 72, 73 and 74, 75, are supported for pivotal movement about the shaft 82, as previously explained, and the rear ends thereof are adapted to be selectively raised or lowered to move the stop 60 out of or into operative position. As shown, the rear ends of the guide members 72, 73, 74, 75 are connected by a plurality of pivoted links 120, 121, 122, 123 to levers 124, 125, 126, 127, which levers are in turn pivotally connected to rearwardly extending arms 130, 131, 132, 133 formed integral with brackets 134, 135 bolted to the rear side of the flange 34 of the plate 33. The links 120 to 123 are connected to the levers 124 to 127 intermediate their ends and the free ends of the levers 124 to 127 are connected by a longitudinally extending rod 136 welded thereto. The construction is such that as the levers 124 to 127 are rotated about their pivotal connections with the arms 130 to 133 upon manipulation of the rod 136 by an operator, the pivots which connect the links 120 to 123 with the levers 124 to 127 are raised from the position shown in Fig. 6 where they are below the pivots which connect the levers 124 to 127 with the arms 130 to 133, to the position shown in Fig. 8 where they are above the pivots referred to. The result is that the rear ends of the guide assemblies are raised so as to move the stop 60 above the path of material being sheared, assuming that the stop 60 has first been moved to or adjacent to its rear position. Material being sheared or to be sheared is shown in dot-dash lines and designated M in Figs. 4, 6 and 8. The brackets 134, 135 include pairs of arms 137, 138, 139, 140 which project downward along opposite sides of the guide members 72, 73 and 74, 75, respectively, and assist in guiding the rear ends of the latter as they are raised and lowered.

Figure 9:
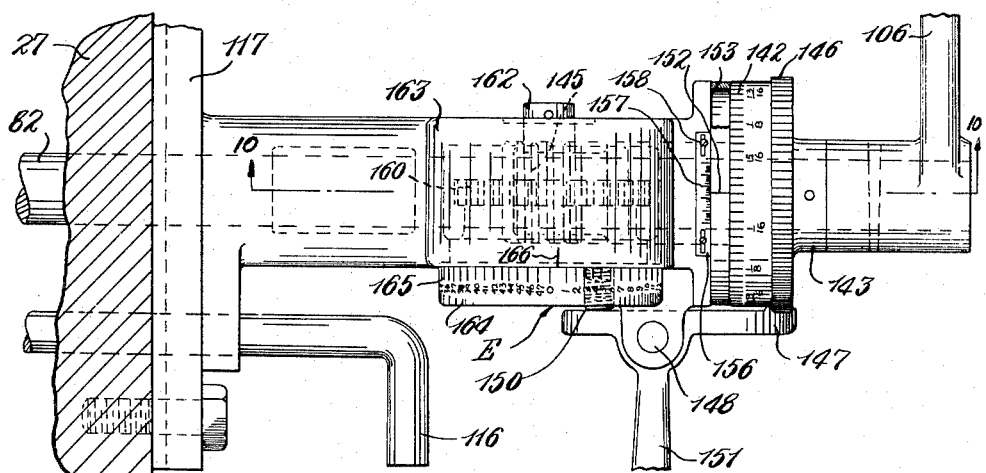
Fig. 9 is an enlarged view of a portion of Fig. 5.
Figure 10:
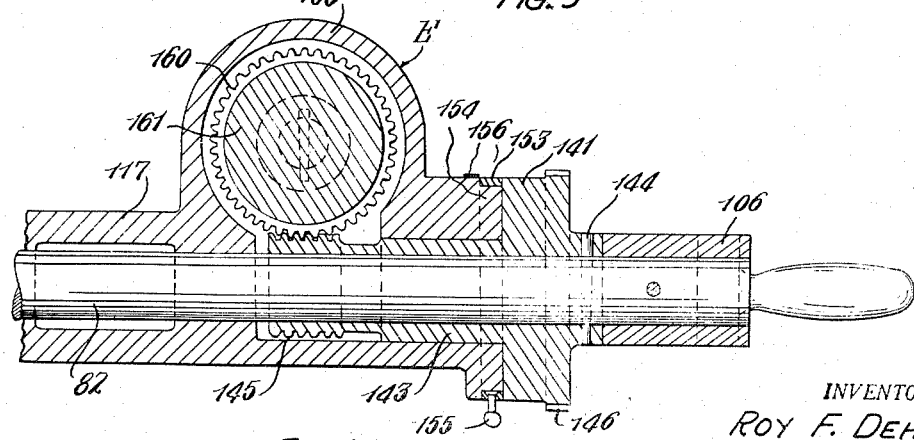
Fig. 10 is a sectional view, with portions in elevation, on the line 10—10 of Fig. 9.

The shears shown also comprise indicator means, designated generally by the reference character E, for showing the setting of the back gauge or for assisting in properly setting the back gauge to the desired position. The indicating means shown comprise an annular dial 141 having a scale 142 thereon reading or graduated in sixty-fourths of an inch. The dial 141 is an integral part of a tubular sleeve-like member 143 surrounding the shaft 82 adjacent to the hand crank 106. The sleeve 143 is fixed to the shaft 82 by a pin 144 and comprises in addition to the dial 141 a worm 145 and a knurled flange 146 adapted to be engaged by the right-hand end of a spring-pressed lever 147 pivoted by a pin 148 to the housing 117. The lever 147 is continuously urged in a direction to engage the right-hand end thereof with the knurls of the flange 146 by a spring 150, located in a suitable aperture in the housing 117 and pressing against the left-hand end of the lever 147, as viewed in Fig. 9. The lever 147 normally maintains the shaft 82 in any position to which it is turned by the hand crank 106. A handle 151 on the lever 147 provides means for raising the lever from engagement with the flange 146 and in turn freeing or releasing the shaft 82 so that it may be rotated. If accuracy greater than that obtainable by the lever 147 engaging the necessarily slightly spaced knurls of the flange 146 is desired, locking means may be provided for securing the shaft 82 in an infinite number of positions, as will be more fully hereinafter described with reference to the modification of the invention shown in Figs. 20 and 21.

The scale 142 is adapted to cooperate with a zero or dead line 152 on a ring 153 rotatably supported on an annular portion 154 of the housing 117 adjacent to the dial 141. The ring 153 is adapted to be secured in any position to which it may be adjusted by a thumb screw 155. The right-hand end of the housing 117 adjacent to the ring 153 is provided with a member 156 having a scale 157 thereon graduated in one-thousandths of an inch, which member is adjustably connected to the housing by a plurality of screws 158 that project through elongated slots in the ends of the member 156. The construction is such that when the shearing knives 24, 25 are set at zero clearance with the back gauge proper abutting the rear side of the stationary shearing knife 24, the zero graduations of the scales 142, 157 and the zero or dead line graduation 152 can all be aligned. The adjustability of the ring 153 incorporates compensating means into the indicator mechanism for various shearing knife clearance settings by merely resetting the zero line 152 at the position on the scale 157 corresponding with the clearance between the shearing knives in thousandths of an inch. If greater accuracy of the position of the back gauge as indicated by the scale 142 or if increased ease of adjustment of the back gauge or both is desired, the dial 141 may be separately mounted on the housing 117 and geared to or otherwise operatively connected with the shaft 82, as will be more fully hereinafter described with reference to the modification of the invention shown in Figs. 20 and 21.

The worm 145 is continuously in mesh with a worm wheel 160 formed about the circumference of the member 161, which member includes an integral shank 162 through the medium of which it is rotatably supported in a boss 163 forming a part of the housing 117. The member 161 includes an annular dial 164 projecting to the front of the boss 163, which dial is provided with an "inch" scale 165 adapted to cooperate with a zero mark 166 on the boss 163. The lead of the screws 95, 96 is such that upon each rotation of the shaft 82, the back gauge moves one inch and the ratio of the worm and worm wheel 145, 160 is such that upon the dial 164 making one revolution, the back gauge is moved forty-eight inches, which happens to be the full travel of the back gauge shown. Alternatively, lead screws of any other suitable pitch or gears of any other suitable ratio may be employed and the dials graduated accordingly to give any desired reading or indication.

It is believed that the operation of the device will be apparent from the foregoing description thereof. In order to set the back gauge in position to shear a strip from a plate or sheet, it is merely necessary to adjust the annular member 153 so as to set the zero mark 152 at the knife clearance being employed and thereafter rotate the hand crank 106 until the desired setting is read upon the scales 142, 165, having first removed the lever 147 free of the knurled flange 146. If it is desired to set the back gauge in an inclined position with respect to the length of the shearing knives, the hand crank 106 can be rotated until the lead screw 95 has moved the right-hand end of the gauge to the desired position. Thereafter the clutch D is operated to disengage the drive to the lead screw 95 whereupon the crank 106 can be operated to rotate the lead screw 96 to move the left-hand end of the gauge to the desired postion.

In the embodiments of the invention shown in Figs. 11 to 22, duplicate parts to those of Figs. 1 to 10 are designated by the same reference characters and similar parts are designated by the same reference character with a prime mark added. Referring more specifically to the embodiments shown in Figs. 11 to 18, an electric motor 170 is employed for actuating the shaft 82' and adjusting the transversely extending bar 60 of the back gauge to the desired position with respect to the shearing knives. The electric motor 170, which is preferably of the alternating current, reversible, two-speed type, actuates a vertically extending shaft 172 through a worm and pinion gear speed reducing mechanism 173, which shaft has keyed to its lower end a beveled gear 174 continuously in mesh with the beveled gear 102'. As shown, the motor 170 and a housing 176 for the reducing gear mechanism 173 are fixedly mounted on the upper surface of the bottom plate 33' of the movable blade or ram B', with the lower end of the shaft 172 extending through a suitable aperture therein. The entire assembly reciprocates or oscillates with the upper blade or ram B'.

The motor 170 is shown positioned intermediate the web members 36', 37. The armature shaft of the motor is parallel to the bottom plate 33' but angularly disposed relative to the longitudinal length of the upper blade or ram B' and extends through a suitable aperture in the web member 36'.

The beveled gear 102' is continuously in mesh with the beveled gear 100 which actuates the lead screw 95 and is keyed to the shaft 82' such that rotation of the vertical shaft 172 actuates both lead screws 95, 96 simultaneously, and in turn the transversely extending bar 60. If desired, a clutch mechanism similar to that shown at D in Fig. 5 could be provided whereby the transversely extending bar 60 could be angularly positioned relative to the shearing knives in the same manner as described with reference to the preferred embodiment.

Indicator means designated generally by the reference character F for accurately indicating the position of the back gauge relative to the shearing knives is shown positioned at the upper end of the vertically extending shaft 172 in a position slightly below and back of the lower front edge of the crown 14 and above the upper edge of the longitudinally extending front plate 26′, the upper edge of which has been lowered from that shown in the preferred embodiment to provide clear visibility of the indicator means. The indicator means F shown comprises a housing member 178 fixed against rotation by a suitable bracket 179 attached to the upper edge of the longitudinally extending front plate 26′, an annular dial 180 having a scale 181 thereon graduated or reading in 64ths of an inch, which dial is keyed to the shaft 172, and a second annular dial 182 having a scale 183 thereon graduated or reading in inches, which dial is driven or rotated from the shaft 172 through a suitable worm and pinion gear arrangement 184 positioned within the housing 178. As shown, the "1/64" scale 181 on the dial 180 is adapted to cooperate with a zero or dead line 186 suitably inscribed on the portion of the housing 178 adjacent thereto. If desired, suitable means for compensating for the various shearing knife clearance settings can be provided similar to the compensating means shown in the preferred embodiment.

The "inch" scale 183 is adapted to cooperate with a zero or dead line 188 suitably inscribed on the portion of the housing 178 adjacent thereto. The scales 180, 183, the gear ratio of the worm and pinion wheel drive for the annular dial 182, the gear ratio of the gears 174, 102′, 100, the gear ratio of the gears 103, 104, and the lead of the lead screws 95, 96 are preferably all so proportioned that corresponding movements of the transversely extending bar 60 are accurately indicated on the indicator means. A normally engaged disc brake (not shown) incorporated in the motor mounting and electrically disengaged when the motor 170 is energized is provided such that once the transversely extending bar 60 has been positioned by suitable rotation of the motor 170 and the motor deenergized, the bar 60 will remain locked in such position. Alternatively, the worm and pinion gear speed reducing mechanism 173 for the motor 170 may be of the self-locking type.

Figure 11:
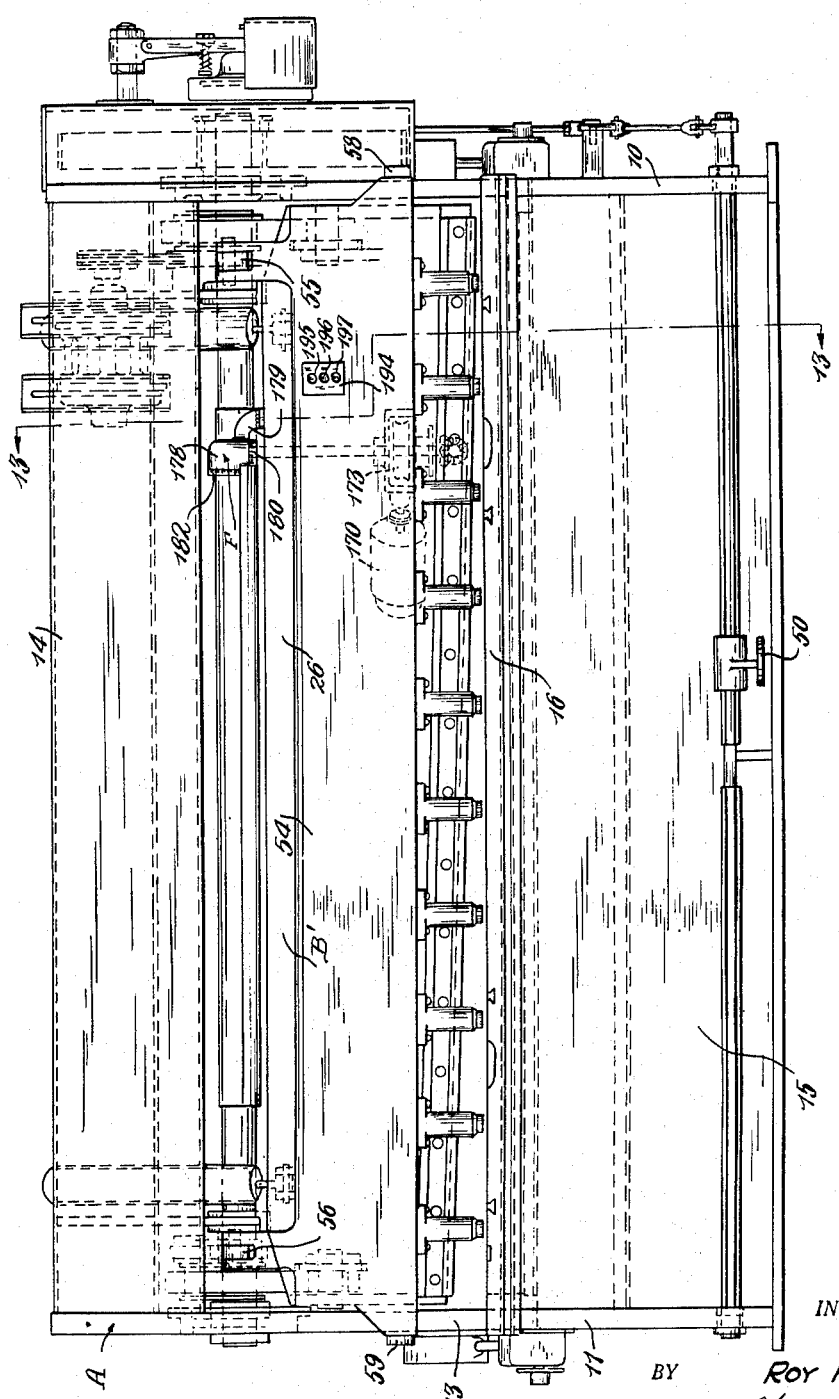
Fig. 11 is a front elevational view of a power-operated heavy duty shears embodying the present invention, but of modified construction.
Figure 12:
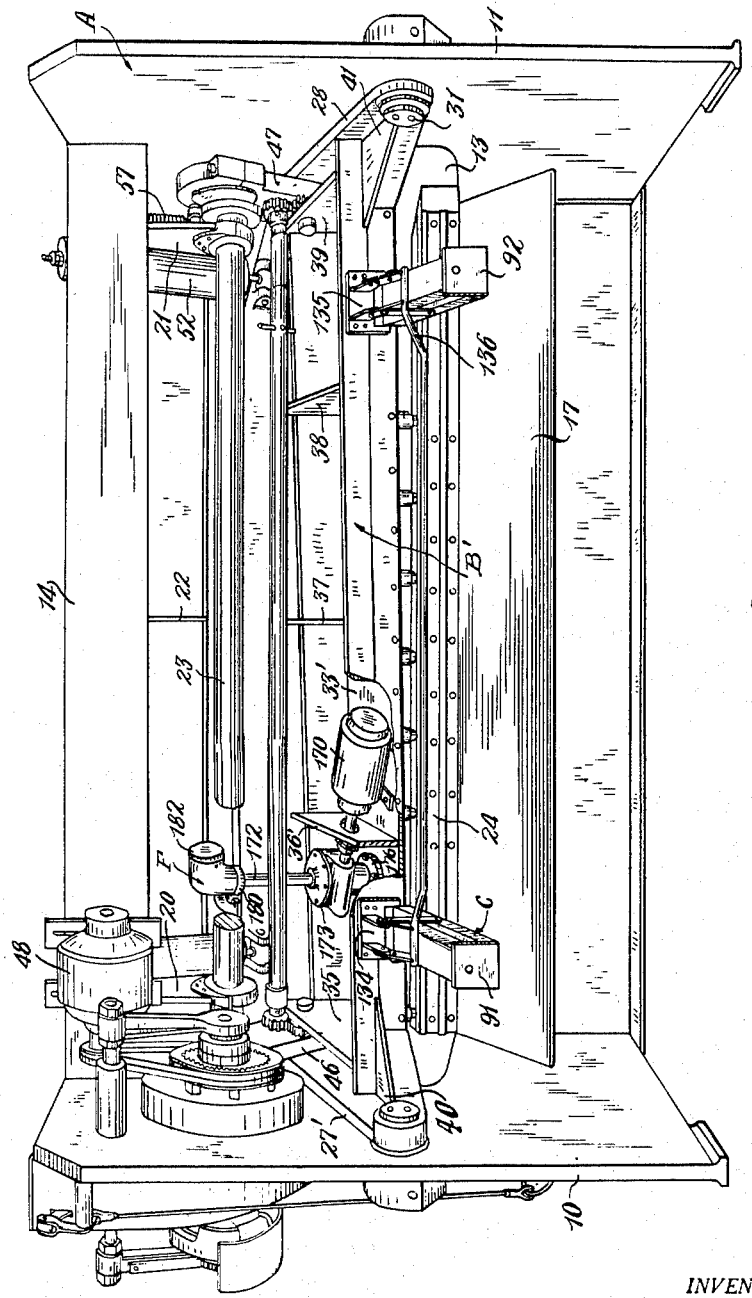
Fig. 12 is a rear view of the shears shown in Fig. 11.
Figure 13:
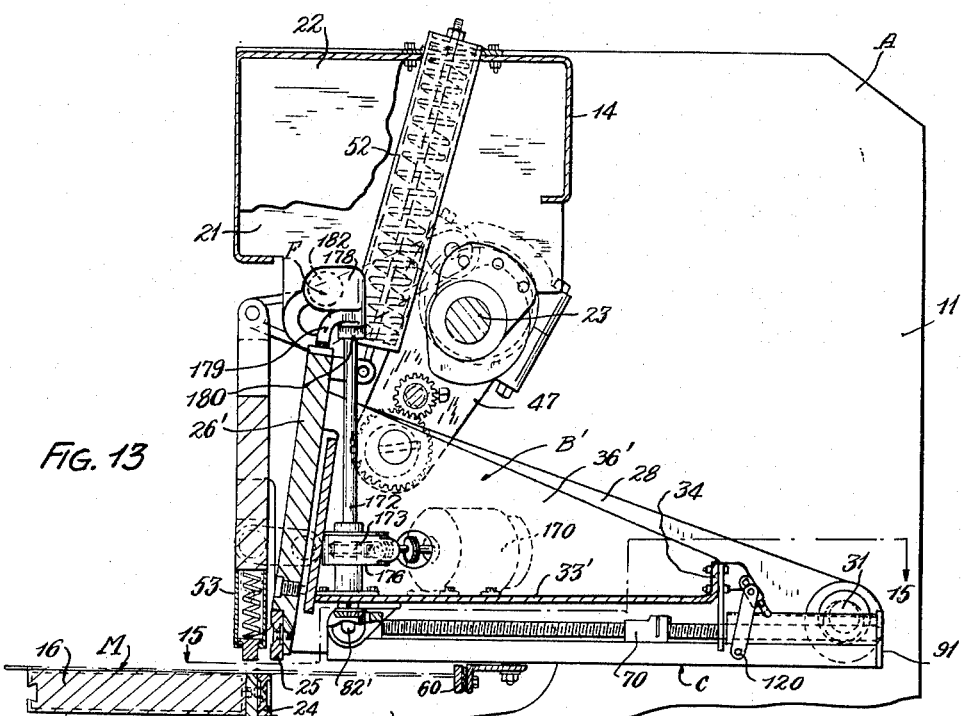
Fig. 13 is a fragmentary sectional view on the line 13—13 of Fig. 11.

With the construction shown, the dial mechanism F is positioned immediately behind the front plate 26′ and is readily visible from the front of the shears where the operator normally stands and, as shown in Fig. 11, where the control box 194 for controlling the motor 170 is located. Also, the back gauge is readily movable relative to the motor 170 and the blade B′ to and from its operative position by raising and lowering the rear ends of the guides 70, 71 and 72, 73, the forward ends being pivoted to and supported by the shaft 82′.

The motor 170 is preferably a two-speed, three-phase, alternating current, squirrel-cage type electric motor having a high speed field coil winding 190 and a low speed field coil winding 191. The disc brake above referred to has an electrically energized three-phase electrical actuating coil winding 192 which is energized simultaneously with either the high speed field winding 190 or the low speed field winding 191 to release the disc brake and permit rotation of the motor armature.

The starting, stopping, direction of rotation, and speed of the motor 170 are controlled by suitable electric switches, which are preferably of the push button type, each having a pair of normally open and a pair of normally closed contacts. In the embodiment shown, provision is made for rotating the armature of the motor 170 to move the back gauge mechanism forward at either a fast or slow speed, but for moving it backwards at only a single high speed. The electric switches for controlling the motor 170 are shown mounted on the hold-down plate 54 of the shear press in a suitable control box 194, which switches comprise a "forward slow" push button switch 195, a "forward fast" push button switch 196, and a "reverse fast" push button switch 197. The control circuits for these push button switches are preferably so interlocked such that if more than one is depressed the motor field coil windings will not be energized. Limit switches 198, 199, each having a pair of normally closed contacts, are mounted on the guide 72 at the rear and forward ends thereof, respectively, and are so positioned thereon as to have their actuating arms engageable by the upwardly extending portion 93 on the slide 70. The limit switches, which may be adjustably positioned on the guide 72, are so connected into the control circuits such that if one limit switch should be actuated to stop further movement of the back gauge mechanism in that direction, the motor 170 may still be energized for driving the back gauge mechanism in the opposite direction. Bypass switches may be provided for one or both limit switches.

Figure 18:
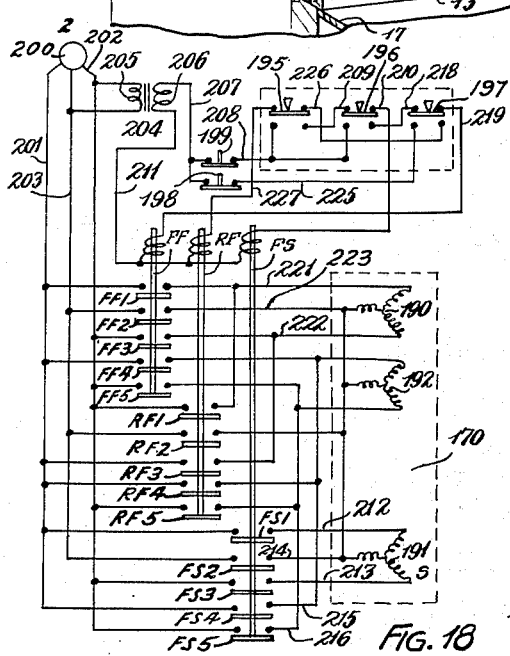
Fig. 18 is a wiring diagram showing the control circuits for the shears shown in Figs. 11 to 14.
Figure 14:
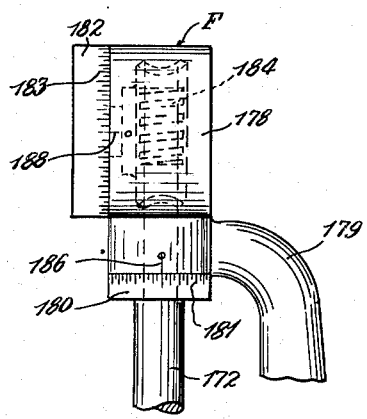
Fig. 14 is an enlarged view of the dial indicating mechanism shown in Fig. 13.
Figures 15, 16, 17:
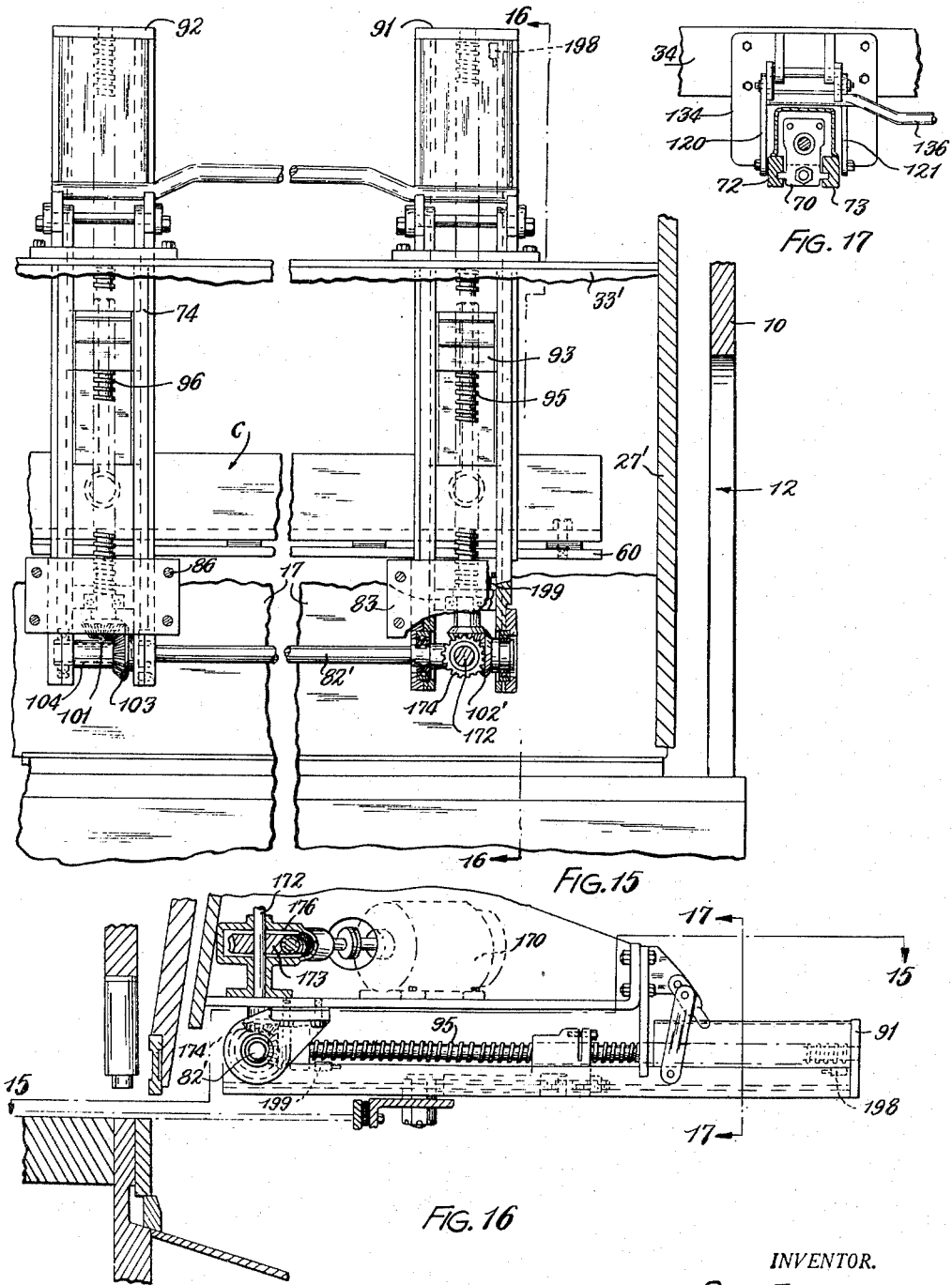
Fig. 15 is a fragmentary sectional view approximately on the line 15—15 of Fig. 13.
Fig. 16 is a sectional view on the line 16—16 of Fig. 15.
Fig. 17 is a fragmentary sectional view on the line 17—17 of Fig. 16.

Referring to the circuit diagram shown in Fig. 18, the field coil winding of the motor 170 and the disengaging coil winding for the disc brake are energized from a suitable source of three-phase alternating current 200, which source continuously maintains energized alternating voltage supply buses 201, 202, 203. The push button switches and the operating relays associated therewith are preferably energized at a relatively low voltage through a step-down type transformer 204 having its primary 205 connected across the supply bus wires 202, 203. The secondary 206 of the transformer 204 may supply any desired suitable voltage at its terminals for actuating the control relays to be referred to. Relay FS when energized completes energization circuits to the slow speed coil winding 191 of the motor 170. Relays FF, RF when energized complete energization circuits to the high speed coil winding 190, the phase of the voltage for the relay RF being opposite to that for the relay FF. Each of the three relays when energized complete energization circuits to the brake actuating coil winding 192.

Assuming it is desired to rotate the armature of the motor 170 in a forward direction so as to drive the back gauge mechanism forward and at a low speed, the "forward slow" push button switch 195 is depressed completing a circuit from the wire 207 connected to one terminal of the transformer secondary 206, through the normally closed contacts of the limit switch 199, wire 208, the now closed normally open contacts of the push button switch 195, wire 209, the normally closed contacts of the "forward fast" push button switch 196, wire 210, the actuating coil of relay FS, and thence through wire 211 to the opposite terminal of the secondary 206 of the transformer 204. Energization of the actuating coil of the relay FS closes the normally open contacts FS1, FS2, FS3, FS4, FS5 thereof. Closing of the normally open contacts FS4, FS5 completes a circuit from the wires 201, 202 to the wires 215, 216, respectively, which wires are connected as shown to the brake winding 192 for disengaging the disc brake supported in the motor mounting. Closing of normally open contacts FS1, FS2, FS3 completes a circuit from the wires 201, 202, 203 to the wires 212, 213, 214, respectively, thus energizing the slow speed field coil winding 191 of the motor 170. Release of the "forward slow" push button switch 195 de-energizes the relay FS and the contacts thereof return to their normally open position.

Assuming it is desired to drive the back gauge mechanism in the same direction but at a greater rate of speed, the "forward fast" push button switch 196 is depressed, completing a circuit from the wire 208, the energization of which was previously traced, through the now closed normally open contacts of the push button switch 196, wire 218, the normally closed contacts of the push button switch 197, wire 219, and thence through the actuating coil of the relay FF to the wire 211. Energization of the actuating coil of the relay FF closes its normally open contacts FF1, FF2, FF3, FF4, FF5. Closing of the normally open contacts FF4, FF5 completes a circuit from wires 201, 202 to the wires 215, 216, thus energizing the brake winding 192. Closing of the normally open contacts FF1, FF2, FF3 completes a circuit from the wires 201, 202, 203 to the wires 221, 222, 223, respectively, thus energizing the high speed field coil winding 190 on the motor 170, causing the armature of the motor 170 to operate at a high speed. Release of the "forward fast" push button switch 196 de-energizes the actuating coil of the relay FF, thus de-energizing the windings 190, 191, re-engaging the disc brake and de-energizing the motor 170. It will be noted that as the back gauge mechanism reaches the desired front limit of its travel, the upstanding portion 93' engages the actuating arm of the limit switch 199, thus opening its normally closed contacts and de-energizing the wire 208 which serves as a common energizing bus for both the relay FS and the relay FF.

Assuming it is desired to move the back gauge mechanism to the rear, the "reverse fast" push button switch 197 is depressed, completing a circuit from the wire 207 through the normally closed contacts of the limit switch 198, wire 225, the now closed contacts of the "reverse fast" push button switch 197, wire 226, the normally closed contacts of the "forward slow" push button switch 195, wire 227, and thence through the actuating coil of the relay RF to the wire 211. Energization of the actuating coil of the relay RF closes the normally open contacts RF1, RF2, RF3, RF4, RF5 thereof. Closing of the normally open contacts RF4, RF5 completes a circuit from the wires 201, 202 to the wires 215, 216, respectively, with the results as previously indicated with reference to the closing of contacts FS4, FS5, and FF4, FF5. Closing of the normally open contacts RF1, RF2, RF3 completes a circuit from the wires 202, 203, 201 to the wires 221, 223, 222, respectively, with the results as previously indicated with reference to the closing of contacts FS1, FS2, FS3, with the exception that the phase of the alternating current voltage applied to the high speed field coil winding 190 has been switched such as to cause the armature of the motor 170 to rotate in the opposite direction. Release of the reverse fast push button switch 197 de-energizes the actuating coil of the relay RF and thus the windings 190, 191. Should the upstanding portion 193 of the slide 70 engage the actuating arm of the limit switch 198, the normally closed contacts thereof will be opened, thus de-energizing the wire 225 and preventing further energization of the motor 170 to drive the back gauge mechanism in that direction.

Referring to the embodiment of the invention shown in Fig. 19, means are provided for adjusting the beveled gears of the back gauge drive mechanism relative to each other so as to eliminate any clearance between the gear teeth and, correspondingly, any backlash or other free play therebetween whereby the accuracy of the means for indicating the position of the transversely extending bar 60 relative to the shearing knives may be substantially increased. Only a fragmentary view showing the beveled gear mechanism for actuating the lead screw 95 is shown, although it will be appreciated that the adjusting means can be and should preferably be provided for all the gears in the entire back gauge mechanism. As previously described, the beveled gear 100 is pinned or otherwise suitably fixed against rotation relative to the lead screw 95 and is in mesh with the beveled gear 102 keyed or otherwise fixed to the short sleeve 105 surrounding the shaft 82 and rotatable thereon.

The forward end of lead screw 95 is rotatably supported in the antifriction bearing 99 supported in a suitable opening in a plate 97' extending transversely between and suitably fixed to the guide members 72, 73. The antifriction bearing 99 is shown rigidly fixed against axial movement relative to the lead screw 95 but axially adjustable in the plate 97' by means of an adjusting sleeve 230 surrounding the lead screw 95 and threaded in the plate 97' to the rear of the antifriction bearing 99. The sleeve 230 abuts against the rearmost edge of the antifriction bearing 99 whereby axial movement of the sleeve 230 will move the antifriction bearing 99 and the beveled gear 100 in an axial direction toward the beveled gear 102, eliminating any clearance between the gear teeth thereof. Suitable slots 231 in the rear end of the sleeve 230 are provided for engagement by a suitable adjusting tool. The sleeve 230 may be fixed in any relative adjusted position by any suitable means such as a setscrew 233 threadably engaged in the plate 97' and adapted to force a soft copper plug 234 against the threads of the sleeve 230.

Referring to the modifications of the invention shown in Figs. 20 and 21, provision is there shown for locking the shaft 82 in an infinite number of relative positions as well as actuating the 64ths indicating dial in such a manner as to give increased accuracy of indication and an increased ease of positioning the transversely extending bar 60 relative to the shearing knives. For fixing the shaft 82 in an infinite number of adjusted positions, a friction type lock designated generally at G and actuated by a hand wheel 236 is provided. While the friction lock may take a number of different forms, in the embodiment of the invention shown the lock comprises a pair of aligned spaced sleeves 237, 238 disposed at opposite sides of the shaft 82 and adapted to be moved into clamping engagement therewith. As shown, the sleeves 237, 238 are slidably mounted in an aperture in the housing 117' on an axis transverse to and spaced slightly from the longitudinal surface of the shaft 82. A threaded shaft 240 keyed or otherwise fixed to the hand wheel 236 extends through a central opening in the sleeve 238 and is threadably engaged in a threaded opening in the sleeve 237. Preferably the sleeves 237, 238 have arcuate surfaces for frictionally engaging the surface of the shaft 82. Rotation of the hand wheel 236 in one direction moves the sleeve members 237, 238 towards each other and into frictional clamping engagement with the surfaces of the shaft 82.

The modified indicating means shown comprises an annular dial 141' having a scale 142' thereon reading or graduated in 64ths of an inch. The dial 141' is rotatably supported on a suitable boss 242 formed integral with the housing 117', the axis of which boss is spaced from and parallel to the axis of the shaft 82. The dial 141' has suitable gear teeth 243 on its outer circumference which mesh with suitable gear teeth 244 provided on the right hand end of the sleeve 143' rotatable with and fixed against rotation relative to the shaft 82' by the pin 144. Preferably the ratio of the number of gear teeth 244 to the number of gear teeth 243 is 1 to 2, such that for every two revolutions of the shaft 82 the dial 141' will make one revolution. The gear ratios of the gears 100, 102, the gears 103, 104, and the lead of the threads of the lead screws 95, 96 are such that the transversely extending bar 60 moves one-half inch for every revolution of the shaft 82. If desired, the ratio of the number of gear teeth 244 to the number of gear teeth 243 could be made greater or smaller to permit any desired ratio of movement between the revolutions of the shaft 82 and the linear movement of the transversely extending bar 60, while still maintaining the spacing of the graduations of the scale 142' as shown. A cover plate 245 is fixed on the outer or right hand end of the boss 242 by a threaded bolt extending into the end of the boss 242 and holds the dial 141' on the boss while at the same time providing a guard protecting the gear teeth 243, 244. A vernier scale and means for compensating for the various shearing knife clearance settings similar to that described with reference to the preferred embodiment are also shown.

The construction and operation of the dial 164, which dial is provided with an inch scale, is identical to that shown in the preferred embodiment with the exception that the spacing of the indicia on the inch scale or the gear ratio between the worm 145' and the worm wheel 160' is varied such as to compensate for the change in linear movement of the transversely extending bar 60 for each revolution of the shaft 82, which has been made possible by driving the dial 141' from the shaft 82 through a suitable gear mechanism.

In the modified construction shown in Fig. 22, the guide 72 of the back gauge mechanism is broken away to show more clearly a slide 70' actuated in a fore-and-aft direction by the lead screw 95. The forward end of the slide 70' is pivotally connected directly to the end of the angle iron 63' by a suitable bolt 65 such that the angle iron 63' may be pivoted relative to the slide 70' if desired, but is otherwise fixed relative thereto. The upwardly extending portion 93' is provided with a threaded aperture through which the lead screw 95 projects. A backlash or lost motion take-up plate 248 having a threaded aperture for receiving the lead screw 95 is slightly spaced from the right hand end of the upwardly extending portion 93' and adjusted relative thereto by adjusting bolts 249. The bolts 249 are tightened so that all lost motion or backlash is eliminated. As shown, the transversely extending bar 60 has been eliminated and the downwardly extending flange of the angle iron 63' is machined straight and true and is used as an abutment or stop for the material to be cut.

From the foregoing, it will be apparent that the objects of the invention heretofore enumerated and others have been accomplished and that there has been provided a novel and improved shears comprising back gauge mechanism which can be readily set to the desired position or moved to an inoperative position, if desired. While the preferred embodiments of the invention have been described in considerable detail, the invention is not limited to the particular constructions shown and it is my intention to hereby cover all adaptations, modifications and uses thereof which come within the practice of those skilled in the art to which the invention relates and the scope of the appended claims.

Having thus described my invention, I claim:

1. In shears of the character described, the combination of a movable blade adapted to have a shearing knife connected to the front thereof for cooperation with a stationary shearing knife, a guide member connected to said blade, an abutment member operatively connected to said guide member for movement toward and from the front of said blade and normally projecting in the path of work to be sheared as it is inserted between said knives, and operating means for said abutment member adapted to move said abutment member relative to said blade to an inoperative position at one side of said path and to maintain said member in said inoperative position.

2. In shears of the character described, the combination of a movable blade adapted to have a shearing knife connected to the front thereof for cooperation with a stationary shearing knife, a guide member having one end pivotally connected to said blade, an abutment member supported by said guide member for movement toward and from the front of said blade and normally projecting in the path of work to be sheared as it is inserted between said knives, and operating means for said guide member adapted to rotate the same about its pivotal connection with said blade to move said abutment member to an inoperative position at one side of said path.

3. In shears of the character described, the combination of a movable blade adapted to have a shearing knife connected to the front thereof for cooperation with a stationary shearing knife, a guide member having its front end pivotally connected to said blade, an abutment member supported by said guide member for movement toward and from the front of said blade and normally projecting in the path of work to be sheared as it is inserted between said knives, and operating means for said guide member adapted to rotate the same about its pivotal connection with said blade to move said abutment member to an inoperative position at one side of said path.

4. In shears of the character described, the combination of a housing adapted to support a stationary shearing knife, a movable blade adapted to have a movable shearing knife connected to the front thereof for cooperation with said stationary shearing knife, means for adjusting the horizontal clearance between said stationary and movable shearing knives, a guide member connected to said blade, an abutment member supported by said guide member for movement toward and from the front of said blade, said abutment member being adapted to project in the path of work to be sheared as it is inserted between said knives, operating means for moving said abutment member toward and from the front of said blade, and means adjacent to the front of the shears for indicating the position of said abutment with respect to the cutting edge of the stationary shearing knife, the last-mentioned means including a portion settable in accordance with the adjusted clearance between said knives whereby the said indicating means is adjustable to afford an accurate indication of the position of said abutment for any selected clearance of said knives.

5. In shears of the character described, the combination of a housing adapted to support a stationary shearing knife, a movable blade adapted to have a shearing knife connected to the front thereof for cooperation with said stationary shearing knife, means for adjusting the clearance between said stationary and movable shearing knives, a guide member connected to said blade, an abutment member supported by said guide member for movement toward and from the front of said blade, said abutment member being adapted to project in the path of work to be sheared as it is inserted between said knives, means for indicating the position of said abutment member with respect to the cutting edge of said stationary shearing knife, said last-named means including mechanism for compensating for different knife clearance adjustments.

6. In shears of the character described, the combination of a movable blade adapted to have a shearing knife connected to the front thereof for cooperation with a stationary shearing knife, a pair of guide members connected to said blade and extending rearwardly of said knives, a pair of slides supported by said guide members for movement toward and from the front of said blade, an abutment member carried by said slides and adapted to project in the path of work to be sheared as it is inserted between said knives, operating means common to both of said slides for moving the same relative to said guide members, said last-named means including mechanism for selectively rendering said means inoperative to move one of said slides whereby the other of said slides may be moved by said means independently of the said one slide.

7. In shears of the character described, the combination of a movable blade adapted to have a shearing knife connected adjacent to the front thereof for cooperation with a stationary shearing knife, a pair of guide members extending rearwardly of the front of said movable blade and having their front ends pivotally connected to said movable blade, a pair of slides supported by said guide members for movement toward and from the front of said movable blade, an abutment member carried by said slides and adapted to normally project in the path of work to be sheared as it is inserted between said knives, operating means for rotating said guide members about their front pivotal connections with said movable blade for moving said abutment member to an inoperative position at one side of said path, and operating means common to both of said slides for moving the same relative to said guide members, said last-named means including clutch mechanism whereby one of said slides may be moved independently of the other.

8. In shears of the character described, the combination of a housing adapted to support a stationary shearing knife, a movable blade adapted to have a shearing knife connected adjacent to the lower front edge thereof for cooperation with said stationary shearing knife, means for adjusting the clearance between said stationary and movable shearing knives, a pair of guide members movably connected to said movable blade and extending rearwardly of the front thereof, a pair of slides supported by said guide members for movement toward and from the front of said movable blade, an abutment member carried by said slides and adapted to normally project in the path of work to be sheared as it is inserted between said knives, means for raising said guide members whereby said abutment member may be moved to an inoperative position above said path, and means including mechanism whereby one of said slides may be moved independently of the other for moving said slides relative to said guide members.

9. In shears of the character described, the combination of a housing adapted to support a stationary shearing knife, a movable blade adapted to have a movable shearing knife connected thereto adjacent to the lower front edge thereof for cooperation with said stationary shearing knife, a pair of guide members extending rearwardly of the front of said movable blade and having their front ends pivotally connected to said movable blade, a pair of slides supported by said guide members for movement toward and from the front of said movable blade, an abutment member carried by said slides and adapted to normally project in the path of work to be sheared as it is inserted between said knives, operating means for said guide members adapted to raise the rear ends thereof and move said abutment member to an inoperative position above said path, means for indicating the position of said abutment member with respect to the cutting edge of said stationary shearing knife, and means common to both of said slides for moving the same relative to said guide members, said last-named means including clutch mechanism whereby one of said slides may be moved independently of the other.

10. A back gauge for shears having a movable blade provided with a shearing knife adapted to cooperate with a stationary shearing knife, said gauge comprising a guide member, means adapted for pivotally connecting one end of said guide member to the movable blade of the shears, an abutment member supported by said guide member for movement toward and from the front of the movable blade, said abutment member being adapted to normally project in the path of work to be sheared as it is inserted between the knives of the shears, and means operatively connected to said guide member for moving the other end of said guide member about said pivotal connection whereby said abutment member may be moved to an inoperative position at one side of said path.

11. A back gauge for shears having a movable blade provided with a shearing knife adjacent to its lower front edge adapted to cooperate with a stationary shearing knife, said gauge comprising a guide member, means adapted for pivotally connecting the front end of said guide member to the movable blade of the shears, an abutment member supported by said guide member for movement toward and from the front of the movable blade, said abutment member being adapted to normally project in the path of work to be sheared as it is inserted between the knives of the shears, and means for raising the rear end of said guide member whereby said abutment member may be moved to an inoperative position above said path.

12. A back gauge for shears having a housing supporting a stationary shearing knife, a movable blade provided with a shearing knife adjacent to its lower front edge, and means for adjusting the clearance between the shearing knives, said gauge comprising a pair of guide members, means pivotally connecting said guide members to the movable blade, a pair of slides supported by said guide members for movement toward and from the front of said movable blade, an abutment member carried by said slides and adapted to normally project in the path of work to be sheared as it is inserted between the knives of the shears, means for adjusting said abutment member relative to said blade including mechanism for indicating the position of said abutment member with respect to the cutting edge of the stationary shearing knife, settable means compensating said indicating mechanism for different knife clearance adjustments, and means for raising said guide members whereby the said abutment member may be moved to an inoperative position above said path without disconnecting said adjusting means and indicating mechanism.

13. A back gauge for shears having a housing supporting a stationary shearing knife and a movable blade provided with a shearing knife adjacent to its lower front edge, said gauge comprising a pair of guide members, means adapted for pivotally connecting the front ends of said guide members to the movable blade, a pair of slides supported by said guide members for movement toward and from the front of said movable blade, an abutment member carried by said slides and adapted to normally project in the path of work to be sheared as it is inserted between the knives of the shears, means for raising the rear ends of said guide members whereby said abutment member may be moved to an inoperative position, means common to both of said slides for moving the same relative to said guide members and including mechanism whereby one of said slides may be moved independently of the other, and means for indicating the position of said abutment member with respect to the cutting edge of the stationary shearing knife.

14. In shears of the character described, the combination of a housing adapted to support a stationary shearing knife, a movable blade adapted to have a shearing knife connected to the front thereof for cooperation with said stationary shearing knife, a pair of spaced guide members connected to said blade, an abutment member supported by said guide members for movement toward and from the front of said blade, said abutment member being adapted to project in the path of work to be sheared inserted between said knives, operating means for adjusting the position of said abutment member along said guide members including separate lead screws rotatably supported by each guide member and operatively connected to said abutment member, a common rotatable shaft for actuating said lead screws, means for selectively preventing actuation of one of said lead screws by said shaft without interfering with the actuation of the other of said lead screws thereby, and means operatively associated with said shaft for indicating the position of said abutment with respect to the cutting edge of the stationary shearing knife, said last mentioned means including a first indicating dial having graduations thereon indicating large units of measurement and a second indicating dial having graduations thereon indicating small units of measurement, said second indicating dial being rotatable relative to said shaft and operatively connected therewith through gearing.

15. In shears of the character described, the combination of a housing adapted to support a stationary shearing knife, a movable blade adapted to have a shearing knife connected to the front thereof for cooperation with said stationary knife, a guide member connected to said blade, an abutment member supported by said guide member for movement toward and from the front of said blade, said abutment member being adapted to project in the path of work to be sheared inserted between said knives, means including a rotatable shaft operatively connected with said abutment member for adjusting the position of the latter with reference to said blade, and means for fixing the position of said abutment member in any adjusted position including a friction lock selectively engageable with said shaft.

16. In shears of the character described, the combination of a housing adapted to support a stationary shearing knife, a movable blade adapted to have a shearing knife connected to the front thereof for cooperation with said stationary shearing knife, a guide member connected to said blade, an abutment member supported by said guide member for movement toward and from the front of said blade, said abutment member being adapted to project in the path of work to be sheared inserted between said knives, means including a rotatable shaft operatively connected with said abutment member for adjusting the position of the latter toward and from the front of said blade, means for fixing the position of said abutment member in any adjusted position including relatively movable clamp members located adjacent said shaft, and operating means for moving said clamp members into clamping engagement with said shaft.

17. In shears of the character described, the combination of an arcuately oscillatable blade adapted to have a shearing knife connected to the lower front edge thereof for cooperation with a stationary knife, a pair of guide members pivotally connected to said blade and extending rearwardly of the front thereof, a pair of slides supported by said guide members for movement toward and from the front of said blade, an abutment member carried by said slides and adapted to project in the path of work to be sheared inserted between said blades, operating means common to both of said slides for moving said slides relative to said guide members, said means including a drive shaft adjacent to and extending generally parallel with the front of said blade, a reversible electric motor operatively connected to said drive shaft, and speed and directional controls operatively connected to said motor.

18. In shears of the character described, the combination of a movable blade adapted to have a shearing knife connected to the front thereof for cooperation with a stationary shearing knife, a pair of guide members pivotally connected to said blade, a pair of slides supported by said guide members for movement toward and from the front of said blade, an abutment member carried by said slides and adapted to project in the path of work to be sheared as it is inserted between said knives, means common to both of said slides for moving said slides relative to said guide members, said means including a shaft located adjacent to the front ends of said guide members and extending generally parallel with said knives, an electric motor connected to said shaft, speed and directional controls for said motor, and dial mechanism adjacent to the front of said blade and operatively connected to said shaft and for indicating the position of said abutment member.

19. In shears of the character described, the combination of a movable blade adapted to have a shearing knife connected to the lower front edge thereof for cooperation with a stationary shearing knife, a pair of guide members connected to said blade and extending rearwardly of said knives, a pair of slides supported by said guide members for movement toward and from the front of said blade, an abutment member carried by said slides and adapted to project in the path of work to be sheared as it is inserted between said knives, and means for moving said slides relative to said guide members, said means including a lead screw for each slide, bearing means rotatably supporting said lead screws in said guide members respectively, a common drive shaft connected to said lead screws by gears connected with said shaft and screws, and means for axially adjusting said bearing means thereby adjusting the corresponding gear on the associated lead screw relative to the cooperating gear on said shaft for eliminating clearance between the teeth of the gears.

20. In shears of the character described, the combination of a movable blade adapted to have a shearing knife connected to the lower front edge thereof for cooperation with a stationary shearing knife, and a back gauge mechanism for positioning material to be sheared relative to said knives, said back gauge mechanism including an actuating shaft extending longitudinally of said blade and rotatably supported thereby adjacent to the knife carried thereby, a pair of guide members pivotally supported at their forward ends to said shaft, and an abutment member carried by said guide members and adapted to project in the path of work to be sheared as it is inserted between the knives, said guide members being movable about said common shaft to move said abutment member relative to said movable blade into and out of operative position with respect to said path.

21. In shears of the character described, the combination of a movable blade adapted to have a shearing knife connected to the lower front edge thereof for cooperation with a stationary shearing knife and back gauge mechanism for positioning material to be sheared relative to said knives, said mechanism including a rotatable actuating shaft extending longitudinally of said blade adjacent the lower edge thereof and journaled thereon, a pair of guide members extending rearwardly of said knives and having their forward ends supported by and pivoted on said actuating shaft, a pair of slides supported by said guide members for movement toward and from the front of said blade, an abutment member carried by said slides and adapted to project in the path of work to be shared as it is inserted between said knives, means for actuating said slides in said guide members and adjusting said abutment member transversely of said blade, said means including lead screws operatively associated with said actuating shaft, and means for raising and lowering the rear end of said guide members for moving said guide members about said actuating shaft relative to said movable blade and thereby moving said abutment member to and from operative position with respect to the path of the work.

22. In shears of the character described, the combination of a movable blade adapted to have a shearing knife connected to the lower front edge thereof for cooperation with a stationary shearing knife and a back gauge mechanism for positioning material to be sheared relative to said knives, said back gauge mechanism including an actuating shaft extending longitudinally of said knives adjacent to the lower front edge of said blade and rotatably mounted on the latter, a pair of guide members pivotally supported at their forward end to said shaft, an abutment member supported by said guide members and adapted to project in the path of work to be sheared as it is inserted between said knives, said guide members being movable about said common shaft to move said abutment member into and out of operative position with respect to the path of the material, means operatively connecting said actuating shaft to said abutment member for effecting adjustment of the latter towards and away from said blade, and an electric motor for adjusting said abutment relative to said knives, said motor being connected with said actuating shaft for driving same and adjusting said abutment.

23. In shears of the character described, the combination of a movable blade adapted to have a shearing knife connected to the lower front edge thereof for cooperation with a stationary shearing knife and back gauge mechanism for positioning material to be sheared relative to said blade, said mechanism including a rotatable actuating shaft extending longitudinally of said knives adjacent the lower edge of said blade and journaled thereon, a pair of guide members extending transversely of said knives and having their forward ends supported by and pivoted on said actuating shaft, a pair of slides supported by said guide members for movement toward and from the front of said blade, an abutment member carried by said slides and adapted to project in the path of work to be sheared as it is inserted between said knives, means for actuating said slides in said guide members and adjusting said abutment member transversely of said knives, said means including lead crews operatively connected with said actuating shaft, means for raising and lowering the rear end of said guide members for moving said guide members about said actuating shaft and said abutment member relative to said blade to and from operative position with respect to the path of the material, and a reversible electric motor operatively connected with said actuating shaft for driving same and adjusting said abutment.

24. A back gauge for shears having a housing adapted to support a stationary shearing knife and a movable blade adapted to have a shearing knife connected to the lower front edge thereof for cooperation with the stationary shearing knife, said back gauge comprising a guide member connected to and carried by the movable blade of the shears, an abutment member supported by said guide member for movement relative thereto toward and from the front of the movable blade and adapted to normally project in the path of work to be sheared as it is inserted between the knives, the said abutment member being movable relative to said blade to an inoperative position at one side of said path, and operating means for said abutment member selectively operable to maintain said abutment member in said inoperative position at one side of said path during the normal movements of said movable blade in effecting shearing operations.

25. A back gauge for shears having a housing adapted to support a stationary shearing knife and a movable blade adapted to have a shearing knife connected to the lower front edge thereof for cooperation with the stationary shearing knife, said back gauge comprising a pair of guide members connected to and carried by the movable blade of the shears, a pair of slide members supported by said guide members, lead screws carried by said guide members for moving said slide members toward and from the front of the movable blade, a shaft adjacent to the front of said guide members, means for connecting said shaft to said lead screws, an abutment member carried by said slide members and adapted to normally project in the path of work to be sheared as it is inserted between the knives, the said abutment member being movable relative to said blade to an inoperative position at one side of said path, and operating means for said abutment member selectively operable to maintain said abutment member in an inoperative position at one side of said path during the normal movements of said movable blade in effecting shearing operations.

26. A back gauge for shears having a housing adapted to support a stationary shearing knife and an arcuately movable blade adapted to have a shearing knife connected to the lower front edge thereof for cooperation with the stationary shearing knife, said gauge comprising a guide member pivotally connected to said movable blade, an abutment member carried by said guide member and adapted to normally project in the path of work to be sheared as it is inserted between the knives, means for moving said abutment member relative to said guide member towards and away from said blade, said means including an electric motor, speed and directional controls for said electric motor, and dial mechanism adjacent to the said end of said guide member connected to said blade and visible from the front of said housing for indicating the position of said abutment member.

27. A back gauge for shears having a housing adapted to support a stationary shearing knife and a movable blade adapted to have a shearing knife connected to the lower front edge thereof for cooperation with the stationary shearing knife, said back gauge including a rotatable actuating shaft extending longitudinally of said blade adjacent to the lower edge thereof and rotatably supported thereon, a pair of guide members extending transversely of said blade and having their forward ends supported by and pivoted on said actuating shaft, a pair of slides supported by said guide members for movement toward and from the front of the blade, an abutment member carried by said slides and adapted to project in the path of work to be sheared as it is inserted between the knives, means for actuating said slides in said guide members for adjusting said abutment member transversely of said blade, said means including lead screws operatively associated with said actuating shaft and said slides, and means for raising and lowering the rear end of said guide members for moving said guide members relative to said blade about said actuating shaft and said abutment member to and from operative position in the said path of work to be sheared.

28. A back gauge for shears having a housing adapted to support a stationary shearing knife and a movable blade adapted to have a shearing knife connected to the lower front edge thereof for cooperation with the stationary shearing knife, said back gauge including a rotatable actuating shaft rotatably supported by said blade and extending longitudinally of said blade adjacent to the lower edge thereof, a pair of guide members extending transversely of said blade and having their forward ends supported by and pivoted on said actuating shaft, a pair of slides supported by said guide members for movement toward and from the front of said blade, an abutment member carried by said slides and adapted to project in the path of work to be sheared as it is inserted between the knives, means for actuating said slides in said guide members thereby adjusting said abutment member transversely of said blade, said means including lead screws operatively associated with said actuating shaft and said slides, means for raising and lowering the rear end of said guide members for moving said guide members relative to said blade about said actuating shaft and said abutment member to and from operative position in the path of work to be sheared, and a reversible electric motor operatively connected with said actuating shaft for driving same and adjusting said abutment.

ROY F. DEHN.

REFERENCES CITED

The following references are of record in the file of this patent:

UNITED STATES PATENTS

| Number | Name | Date |
| --- | --- | --- |
| 1,489,081 | Lee | Apr. 1, 1924 |
| 1,852,726 | Stegmann | Apr. 5, 1932 |
| 1,863,005 | Campbell | June 14, 1932 |
| 1,874,296 | Huntsberger | Aug. 30, 1932 |
| 1,895,440 | Barney | Jan. 31, 1933 |
| 2,047,322 | Hazelton | July 14, 1936 |
| 2,071,402 | Hazelton | Feb. 23, 1937 |
| 2,125,539 | Brownlee | Aug. 2, 1938 |
| 2,222,095 | Van Dusen | Nov. 19, 1940 |
| 2,350,540 | Spiller | June 6, 1944 |

FOREIGN PATENTS

| Number | Country | Date |
| --- | --- | --- |
| 7,568 | Great Britain | May 1, 1891 |
| 480,000 | Great Britain | Feb. 16, 1938 |